United States Patent
Hutton

(10) Patent No.: US 6,925,363 B2
(45) Date of Patent: Aug. 2, 2005

(54) POWER ALLOCATION CONTROL IN AN OVERDEMAND SITUATION OF AN AIRPORT SUPPORT SYSTEM

(75) Inventor: Neil Hutton, Ottawa (CA)

(73) Assignee: DEW Engineering and Development Limited, Ottawa (CA)

(*) Notice: Subject to any disclaimer, the term of this patent is extended or adjusted under 35 U.S.C. 154(b) by 49 days.

(21) Appl. No.: 10/351,321

(22) Filed: Jan. 27, 2003

(65) Prior Publication Data

US 2003/0151309 A1 Aug. 14, 2003

Related U.S. Application Data

(60) Provisional application No. 60/352,849, filed on Feb. 1, 2002.

(51) Int. Cl.[7] ............................. H02J 1/00; H02M 1/00
(52) U.S. Cl. ......................... 700/295; 700/286; 307/31
(58) Field of Search ......................... 700/22, 286, 291, 700/292, 293, 295; 307/31

(56) References Cited

U.S. PATENT DOCUMENTS 4,324,987 A * 4/1982 Sullivan et al. ............. 700/295
5,505,237 A * 4/1996 Magne ........................ 141/388

* cited by examiner

*Primary Examiner*—Leo Picard
*Assistant Examiner*—Charles Kasenge
(74) *Attorney, Agent, or Firm*—Freedman & Associates

(57) ABSTRACT

The present invention relates to a method and controller for controlling power allocation in an overdemand situation of at least a passenger loading bridge. A requested amount of power and an amount of power available are determined. The amount of power available and less than the amount of power required is then apportioned on a prioritized basis amongst systems of the at least a passenger loading bridge demanding power to result in a load of the at least a passenger loading bridge requiring no more than the power available and to provide sufficient power to account for one of minimum requirements, operational requirements and ideal requirements for each system based on an operational mode of the at least a passenger loading bridge. The amount of power for provision to each system is determined in dependence upon a priority of the system for the operation of the at least a passenger loading bridge in a predetermined mode of operation.

18 Claims, 6 Drawing Sheets

POWER ALLOCATION CONTROL IN AN OVERDEMAND SITUATION OF AN AIRPORT SUPPORT SYSTEM

This application claims benefit from U.S. Provisional Application No. 60/352,849 filed Feb. 1, 2002.

FIELD OF THE INVENTION

The instant invention relates generally to power allocation and in particular to a method and system for controlling power allocation in an overdemand situation of an airport support system.

BACKGROUND OF THE INVENTION

In recent years air travel has seen a large increase in demand. An ever increasing number of people are choosing air travel for business trips as well as for reaching holiday destinations. Business people, in general, choose air travel because of the time savings, reaching their destination within hours instead of days—for tourists it is the ability to reach far destinations in a short time and at relatively low cost. Due to the large increase in air travel most airports all over the world are operating close to the limits of their capacity and, therefore, need to expand. However, building new airports or airport terminals is a very costly and time consuming process. For example, the time period from the first planning stages to completion of the construction extends normally over more than a decade. Therefore, the capacity of numerous airports has to be increased by temporarily expanding the existing infrastructure. For example, in order to be able to service more aircraft an existing airport terminal is expanded by adding one or more gates with associated airplane embarking/disembarking locations. Often passenger loading bridges are employed to provide a path from the gate to the airplane.

However, adding large power consumers such as a passenger loading bridge to an existing airport terminal generally requires an expansion of existing power feed lines to the airport terminal adding considerable infrastructure costs.

Currently, passenger loading bridges are connected to a 600 Amp feed line. The 600 Amp feed line is then branched off into smaller 200 Amp feed lines for providing power to various operational systems of the loading bridge. Typically loading bridges are equipped with drive mechanisms, preconditioned air systems and ground power units. Therefore, the electrical power received from the 600 Amp power feed line is distributed into three 200 Amp sections of the power distribution network of the passenger loading bridge servicing the drive mechanisms, the preconditioned air systems and the ground power units, respectively. The main feed line and the branched off feed lines are dimensioned for the operational case that all functions are used at a same time. Furthermore, the feed lines are also dimensioned to allow for spikes in the power consumption, for example, caused by a starting electric motor of a drive mechanism of the loading bridge. As is evident, in such a power distribution network the infrastructure is not used economically. For example, when the loading bridge is moved to connect to or disconnect from an aircraft no ground power is provided to the aircraft. Furthermore, it is not necessary to operate the preconditioned air system at full capacity. Therefore, less than 400 Amp are used of the 600 Amp power line. In the other case, when the loading bridge is connected to an aircraft the preconditioned air system provides heating or air-conditioning to the aircraft and ground power is provided to the aircraft. However in this case the drive mechanisms are not in use. Therefore, only a maximum of 400 Amp are used of the 600 Amp power line.

Power management systems are known in the art. For example, so called "Power Miser Systems" selectively switch provision of power to different electrical circuits having different power consuming appliances connected thereto in order to reduce peak power consumption. These power management systems manage a limited supply of power by allowing, for example, in a household to operate only an electrical stove, a washing machine or a dryer at a time. However, such power management systems are very inflexible by just switching OFF/ON provision of power to an electrical circuit and are not useful for many applications where it is not possible to just switch between provision of power to one or another electrical circuit.

Another example is power management systems used in battery operated devices such as laptop computers for switching between an operational mode and a sleep mode in order to conserve the limited energy supply of a battery. Though these power management systems conserve battery power, they do not provide a solution to a problem of operating a plurality of electrical circuits with a limited supply of power.

It would be advantageous to have power allocation control for passenger loading bridges capable of managing situations of overdemand such that the passenger loading bridge is operable in a predetermined mode of operation without exceeding a limited amount of power. This allows, for example, for a considerable expansion of an existing airport without upgrading power feed lines connecting the airport to a power provider as well as a majority of power feed lines distributing power within the airport. Therefore, infrastructure cost for expanding an airport terminal would be considerably reduced.

It is, therefore, an object of the invention to provide power allocation control for a passenger loading bridge capable of managing situations of overdemand such that the passenger loading bridge is operable in a predetermined mode of operation without exceeding a limited amount of power available.

It is further an object of the invention to provide power allocation control for a plurality of passenger loading bridges capable of managing situations of overdemand such that each of the plurality of passenger loading bridges is operable in its predetermined mode of operation without exceeding a limited amount of power available.

SUMMARY OF THE INVENTION

In Accordance with the present invention there is provided a power allocation control system for managing provision of power to a plurality of subsystems of an airport support system. The power allocation control system is capable of managing provision of power in situations of overdemand such that each of the plurality of subsystems is provided with sufficient power for enabling operation of the airport support system in a predetermined mode of operation without exceeding a limited amount of power available.

In accordance with the present invention there is provided a method for controlling power allocation in an overdemand situation of an airport support system comprising the steps of:

determining a requested amount of power;

determining an amount of power available; and, apportioning the amount of power available and less than the amount of power required amongst subsystems demanding power to result in a load of the airport support system requiring no more than the power available and to provide sufficient power where required.

In accordance with the present invention there is further provided a method for controlling power allocation in an overdemand situation of at least a passenger loading bridge comprising the steps of:

determining a requested amount of power;

determining an amount of power available; and, apportioning on a prioritized basis the amount of power available and less than the amount of power required amongst systems of the at least a passenger loading bridge demanding power to result in a load of the at least a passenger loading bridge requiring no more than the power available and to provide sufficient power to account for one of minimum requirements, operational requirements and ideal requirements for each system based on an operational mode of the at least a passenger loading bridge.

In accordance with the present invention there is yet further provided a controller for controlling power allocation in an overdemand situation of an airport support system comprising:

a processor for:

determining a requested amount of power, determining an amount of power available, determining an apportioning of the amount of power available and less than the amount of power required amongst subsystems demanding power to result in a load of the airport support system requiring no more than the power available and to provide sufficient power where required, and providing a control signal based on the determined apportioning;

at least a control device for receiving the control signal and for controlling provision of the apportioned amount of power to at least a subsystem in dependence thereupon; and, a communication link connecting the processor and the at least a control device for providing control signal communication therebetween.

BRIEF DESCRIPTION OF THE DRAWINGS

Exemplary embodiments of the invention will now be described in conjunction with the following drawings, in which.

DETAILED DESCRIPTION OF THE INVENTION

Figure 1A:
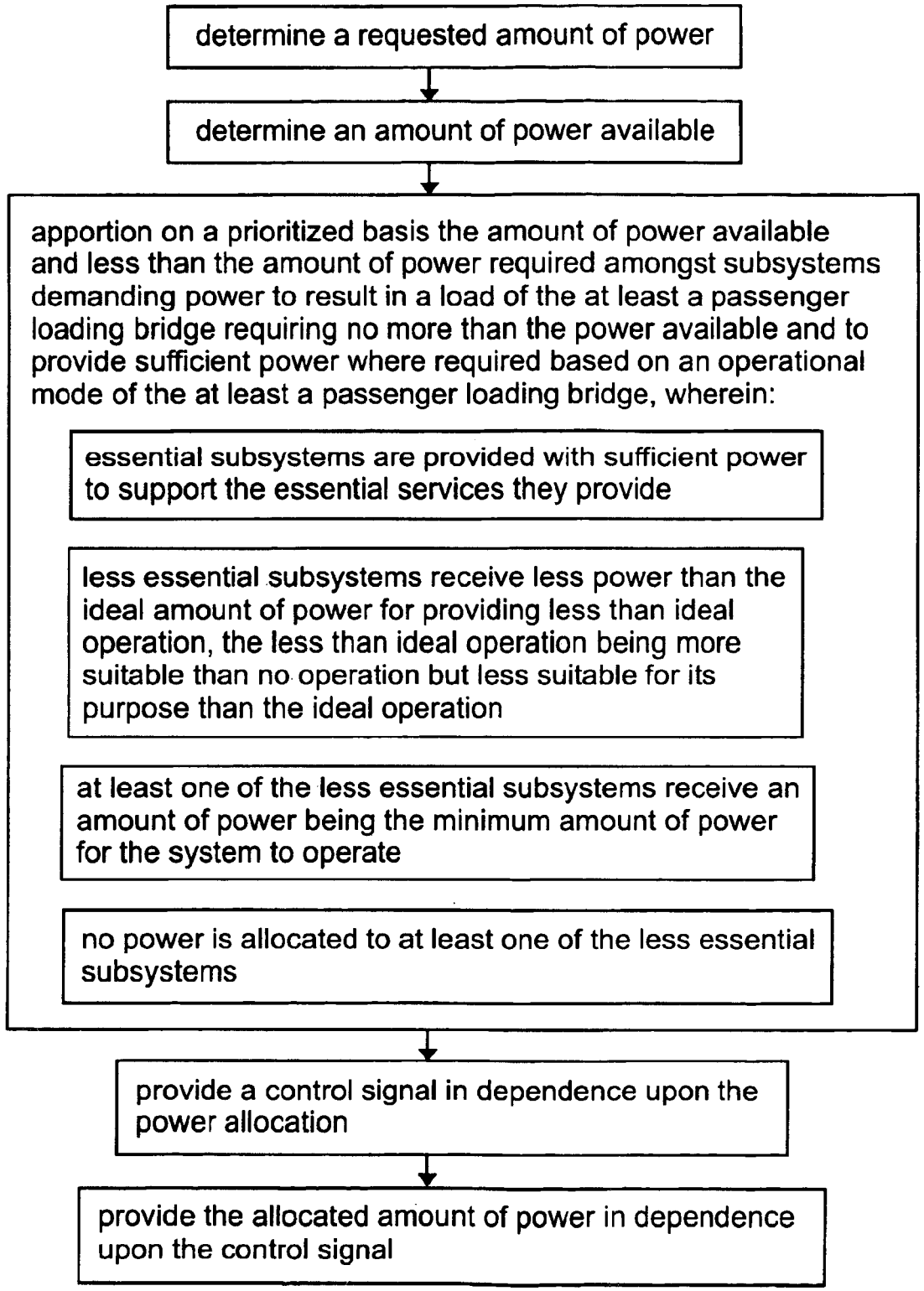
FIG. 1a illustrates a simplified flow diagram of a method for controlling power allocation according to the invention.

The power allocation control according to the invention is described herein using a passenger loading bridge and its modes of operation as an example. It will be evident to those of skill in the art that the power management according to the invention is not limited thereto but is advantageous in numerous other airport support systems such as baggage handling systems, preconditioned air systems for airport terminals or combinations thereof.

In a state of the art electrical power distribution network of a passenger loading bridge the electrical power is received from a 600 Amp power line. The received power is then distributed in a fixed and invariable fashion into three 200 Amp electrical circuits of the power distribution network, for example, a circuit for drive mechanisms of the loading bridge, a circuit for a preconditioned air system, and a circuit for providing ground power to a serviced aircraft. It is noted that passenger loading bridges designed for operation in cold climates often include electric baseboard heaters. In each of the three modes of operation it is possible to leave the heaters active or to cycle them on and off.

As is evident, in such a power distribution network the existing infrastructure is used economically in that all systems are always available and the installed infrastructure supports maximum flexibility. Unfortunately, such an infrastructure does not support expansion of the airport support systems.

It has now been found that a mode effective power management method and system allows for expansion of airport systems beyond the present ability of the airport infrastructure without requiring changes to that infrastructure. This is achieved by recognizing that not all systems require their maximum power allocation at all times. For example, when the loading bridge is moved to connect to or disconnect from an aircraft no ground power is provided to the aircraft. Furthermore, it is not necessary to operate the preconditioned air system at full capacity. Therefore, less than 400 Amp of the 600 Amp power line are used. In the other case, when the loading bridge is connected to an aircraft the preconditioned air system provides heating or air-conditioning to the aircraft and ground power is provided to the aircraft. However in this case the drive mechanisms are not in use. Therefore, only a maximum of 400 Amp are used of the 600 Amp power line.

TABLE 1a

| Mechanism | Function | Absolute Minimum | Minimum to Operate | Operational | Ideal |
|---|---|---|---|---|---|
| Drive Mechanism | Extend cab | 0 | 30 | 35 | 40 |
| | Rotate cab | 0 | 30 | 35 | 40 |
| | Raise/lower cab | 0 | 50 | 60 | 70 |
| | Extend bridge | 0 | 50 | 60 | 70 |
| | Revolve bridge | 0 | 50 | 60 | 70 |
| | Height adjust | 30 | 30 | 35 | 35 |
| Preconditioned Air | Compressor/heater | 0 | 100 | 100 | 100 |
| | Filter | 0 | 25 | 35 | 35 |
| | Fan | 0 | 15 | 60 | 70 |
| Ground Power | Aircraft lights | 0 | 10 | 10 | 25 |
| | Aircraft systems | 0 | 5 | 25 | 25 |

Referring to Table 1a, a table is shown including each system and subsystem of a passenger loading bridge and their power allocation for each of three priority levels. In Table 1b, a table is presented showing the priority levels of the passenger loading bridge subsystems for different operational modes. As is evident from the tables, of the drive systems, only the level adjust subsystem of the passenger loading bridge is operational outside of the drive mode. Because that system has a priority that is high and has minimum requirements, the amount of power required by that system is always made available to the level adjust subsystem. Thus, 30 Amps of power are allocated to each and every passenger loading bridge, during use, to ensure that the height of the cab end is aligned with the aircraft. Because this is a safety feature, it is important that it remains operational whenever the passenger loading bridges are in use. Of course, when a passenger loading bridge is other than in use, for example it is being maintained or is idle, the 30 Amps of power need not be allocated thereto.

TABLE 1b

| Mechanism | Function | Drive Mode | Pre-Embark Mode | Embark Mode |
|---|---|---|---|---|
| Drive Mechanism | Extend cab | High | Low | Low |
|  | Rotate cab | High | Low | Low |
|  | Raise/lower cab | High | Low | Low |
|  | Extend bridge | High | Low | Low |
|  | Revolve bridge | High | Low | Low |
|  | Height adjust | High | High | High |
| Preconditioned Air | Compressor | Medium | High | High |
|  | Filter | Low | High | High |
|  | Fan | Low | Medium | High |
| Ground Power | Aircraft lights | Low | Low | Medium |
|  | Aircraft systems | Low | Medium | High |

All other subsystems are turned off or on during use depending on the current operating mode of the system and a priority of the subsystem. For example, all other drive subsystems are only provided with power during the drive mode. Outside of the drive mode, they are unnecessary and therefore, remain unpowered.

The preconditioned air subsystems are divided into pre-operational subsystems such as the compressor, which is preferably engaged long enough before the system functions adequately, and in use subsystems such as the fan, which is only needed when the aircraft is engaged for conditioning of air therein. These subsystems are allocated different priorities accordingly. Of course, providing less power to the fan results in a slower conditioning—exchange—of air within the aircraft. That said, the slower conditioning is preferable in many situations to no conditioning or to failure of an essential system.

It is evident to those of skill in the art that in use, so long as the minimum power level for each system is maintained, the system will remain at least partially operational. Below the minimum power level, system operation is compromised. At an ideal power level, the system operates within specifications to achieve a desired performance. That said, there are many situations where less than optimal performance is acceptable in order to save on significant infrastructure related expenses which are then passed onto the airlines in the form of usage fees. Thus, the slight inconvenience or lower quality of operation of some systems or subsystems, results in cost savings and is thus beneficial to the airline and subsequently to travelers.

Further, because there is a significant range of powers that function with some elements, such as the fan and the aircraft systems, it is possible to provision power therebetween at variable levels other than a minimum level and an ideal level and between different passenger loading bridges in order to maintain operation of same without requiring further power infrastructure expenditures to provide power to each passenger loading bridge individually from the power main provided to the airport.

Figure 1B:
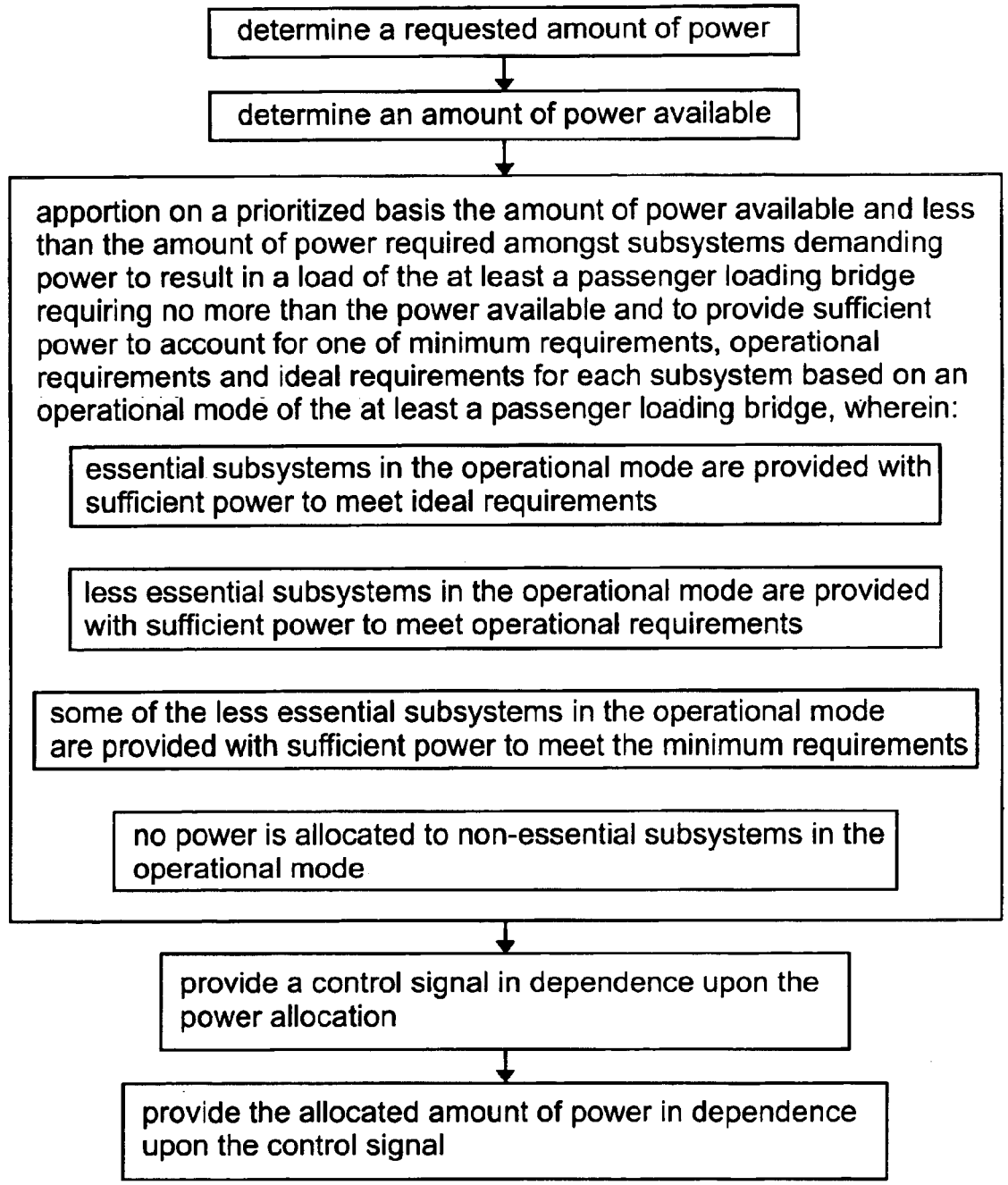
FIG. 1b illustrates a simplified flow diagram of a method for controlling power allocation according to the invention.

Referring to FIGS. 1a and 1b, a method for controlling power allocation in an overdemand situation of at least a passenger loading bridge according to the invention is shown. The method is described hereinbelow with respect to a system implementation 100 according to the invention shown in FIG. 2a. A processor 110 determines a requested amount of power for provision to subsystems 104, 106, and 108 of passenger loading bridge 103. The processor 110 then determines an amount of power available at feed line 102 for provision to the subsystems 104, 106, and 108. In a following step the amount of power available and being less than the amount of power required is apportioned on a prioritized basis amongst the subsystems demanding power. The amount of power available is apportioned such that the resulting load requires no more than the power available and that sufficient power is provided to the subsystems where required in a given operational mode of the passenger loading bridge 103. The processor 110 then provides a control signal in dependence upon the power allocation and indicative of an amount of power for provision to each of the subsystems 104, 106, and 108. Alternatively, the processor produces a plurality of control signals, each being indicative of an amount of power for provision to one of the subsystems 104, 106, and 108. The control signal is received at control device 112, which is in signal communication with the processor 110, for providing the allocated amount of power by the control device 112 to each subsystem 104, 106, and 108 in dependence upon the control signal.

The method for controlling power allocation in an overdemand situation according to the invention is highly advantageous by determining an amount of power for provision to each subsystem such that a predetermined mode of operation of the passenger loading bridge is enabled without exceeding a maximum amount of power available. Preferably, power allotment accounts for peak demands of each system as well as typical loads.

As shown in Table 1b, the operation of the passenger loading bridge is divided into three main modes of operation, a drive mode, a pre-embark mode, and an embark mode. In the drive mode the drive mechanisms of the passenger loading bridge have high priority as essential subsystems. Therefore, power allocation will provide these subsystems with sufficient power to support the drive operation of the passenger loading bridge. Preferably, the drive mechanisms are provided with the ideal amount of power as shown in table 1b in order to allow quick adjustment of the passenger loading bridge. Alternatively, when the available power is not sufficient the drive mechanisms are provided with a less than ideal amount of power but enough to keep the drive mechanisms operational resulting in more time needed for the drive operation. Optionally, the drive mode is divided into a sequence of modes each including a portion of the operation. For each of the sequence of modes, an amount of power for provision to each drive subsystem during that portion of the sequence of modes is determined. For example, dividing the drive mode into a pivot mode for pivoting the passenger loading bridge and an extending mode for extending/retracting the passenger loading bridge allows sequential provision of power for pivoting and extending/retracting the passenger loading bridge resulting in a more effective power distribution compared to the case when pivoting and extending/retracting of the passenger loading bridge are performed at a same time or within a same mode. The preconditioned air subsystem is divided into pre-operational subsystems such as the compressor, which must be engaged before the subsystem functions adequately, and in use subsystems such as the fan, which is only needed when the airplane is engaged and is to be conditioned. These subsystems are allocated different priorities accordingly. For example, the compressor has a medium priority and is provided with sufficient power to be operational, while the fan and filter subsystems have a low priority and are shut down. As is evident, the subsystems for providing ground power to a serviced aircraft are not in use during the drive operation and are, therefore, shut down.

As is evident from Table 1b, only the level adjust subsystem of the drive subsystems of the passenger loading bridge is operational in the pre-embark mode and the embark mode. For safety reasons it is necessary to ensure that the height of the cab end of the passenger loading bridge is aligned with the aircraft. Therefore, it is important for the level adjust system to remain operational while the other drive subsystems are unnecessary and remain unpowered. In the pre-embark mode and the embark mode provision of preconditioned air to a serviced aircraft is essential for providing user convenience as well as safety. For safety reasons the preconditioned air is filtered. Therefore, the filter subsystem has a high priority in the embark mode as well as in the pre-embark mode, preferably provided with the ideal amount of power, while the fan subsystem has medium priority in the pre-embark mode where less than optimal performance is acceptable and high priority only in the embark mode in order to provide user convenience. The subsystem for provision of groundpower for aircraft lighting has a low priority in the pre-embark mode but is preferably provided with a minimum amount of power for safety reasons and for providing basic lighting function for personnel servicing the aircraft such as cleaners and caterers. In the embark mode aircraft lighting has a medium priority, because a less than optimal performance is acceptable without considerably compromising user convenience. In the pre-embark mode less than optimal performance of aircraft systems is acceptable. Therefore, the subsystem for provision of groundpower to the aircraft systems have medium priority in the pre-embark mode which is then changed to high priority in the embark mode.

Thus a situation of overdemand resulting from, for example, a reduced power allocation to the passenger loading bridge is managed by reducing the provision of power to the subsystems having a lower priority in a mode of operation such as the preconditioned air system in the drive mode in order to free power for provision to the drive mechanism subsystems having a high priority. Depending on the amount of power available, it is possible to significantly reduce power provision to the preconditioned air system to a level sufficient to keep the system at "ready".

After the passenger loading bridge is adjusted and, for example, a signal indicating a change in the mode of operation to the pre-embark mode is received the preconditioned air subsystem is provided with sufficient power enabling provision of a comfortable atmosphere for passengers entering the aircraft. Optionally, provision of power to a subsystem having lower priority is increased when power consumption of a subsystem having high priority is reduced. For example, when power consumption of the drive mechanism subsystem is reduced, during final small adjustments of the passenger loading bridge, it is possible to provide more power to the preconditioned air subsystem.

Further, when some systems require at least a predetermined amount of power, the period of time over which the power is necessary is typically defined as one or more modes of operation in order to prevent a situation where the minimum amount of power is unnecessary but is still provided.

As is evident to a person of skill in the art, there are numerous possibilities utilizing the method for controlling power allocation in an overdemand situation according to the invention, for example, in airport support systems such as baggage handling systems, or air conditioning and lighting systems of airport terminals. Furthermore, numerous methods for prioritizing a subsystem in a predetermined mode of operation and for allocating the respective power are applicable depending on the type of airport support system and its modes of operation.

Figure 2A:
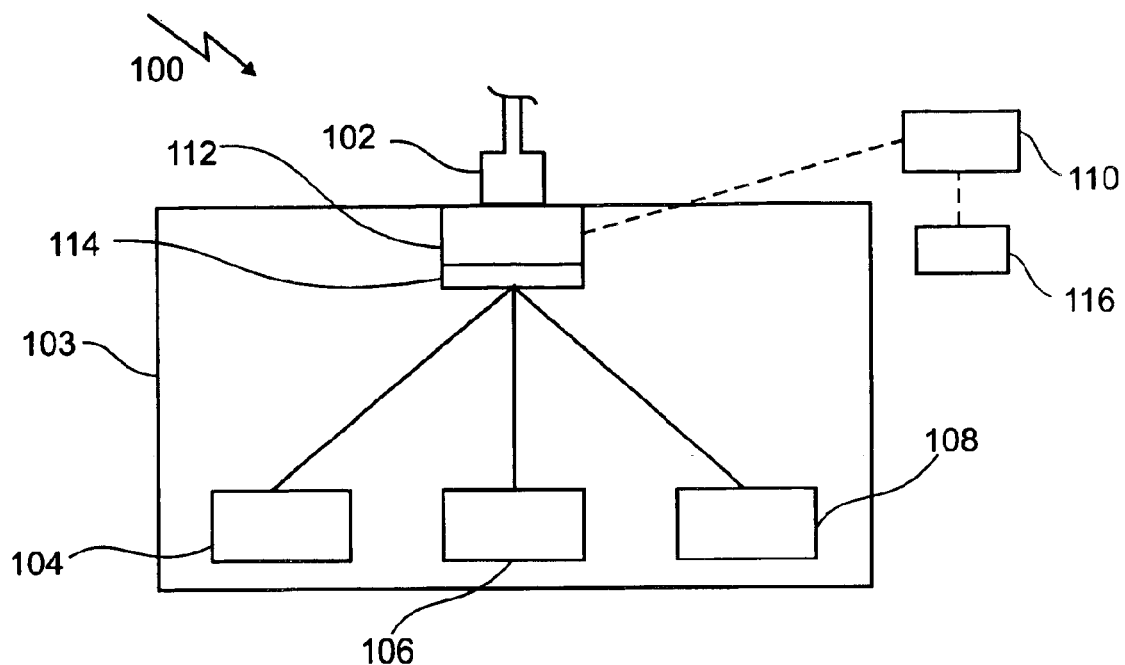
FIG. 2a shows a simplified block diagram of a controller for controlling power allocation according to the invention.

Referring to FIG. 2a, a simple embodiment of a controller for controlling power allocation in an overdemand situation of an airport support system according to the invention is shown. The controller 100 comprises a processor 110 connected to a control device 112 via a communication link, indicated by the dashed line, for providing signal communication therebetween. The control device 112 is connected to a power feed line 102. The power feed line is branched off in the control device 112 for controlled provision of power to subsystems 104, 106, and 108 of passenger loading bridge 103. The processor 110 determines a requested amount of power for provision to subsystems 104, 106, and 108 of passenger loading bridge 103. The processor 110 then determines an amount of power available at feed line 102 for provision to the subsystems 104, 106, and 108, apportions the amount of power available and being less than the amount of power required on a prioritized basis amongst the subsystems demanding power as disclosed above and provides a signal in dependence thereupon.

The signal is then transmitted to the control device 112 and for provision of the apportioned amount of power to each subsystem 104, 106, and 108 in dependence thereupon. The control device 112 and the processor 110 are housed in a same housing or, preferably, in separate housings. For example, the control device 112 being located at the feed line 102, while the processor 110 in the form of a workstation is located in an operator's cabin. Furthermore, the processor 110 is connected to an interface 116 for receiving a request for provision of power. The interface 116 is, for example, a user interface such as a keyboard or an interface connected to the subsystems 104, 106, and 108, not shown.

Optionally, the controller 100 includes a monitor sensor 114 for monitoring provision of power to the subsystems 104, 106, and 108 and for providing a monitor signal in dependence thereupon for transmission to the processor 110.

Further optionally, the control device 112 comprises a secondary processor in communication with the processor 110 for performing portions of the tasks or for providing basic functionality in case of a failure of processor 110.

Figure 2B:
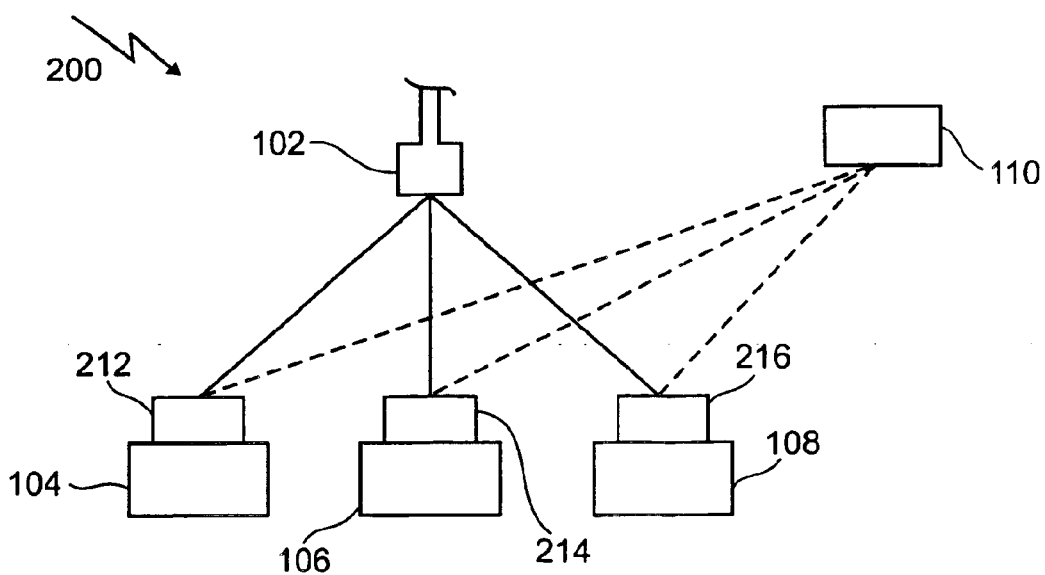
FIG. 2b shows a simplified block diagram of a controller for controlling power allocation according to the invention.
Figure 2C:
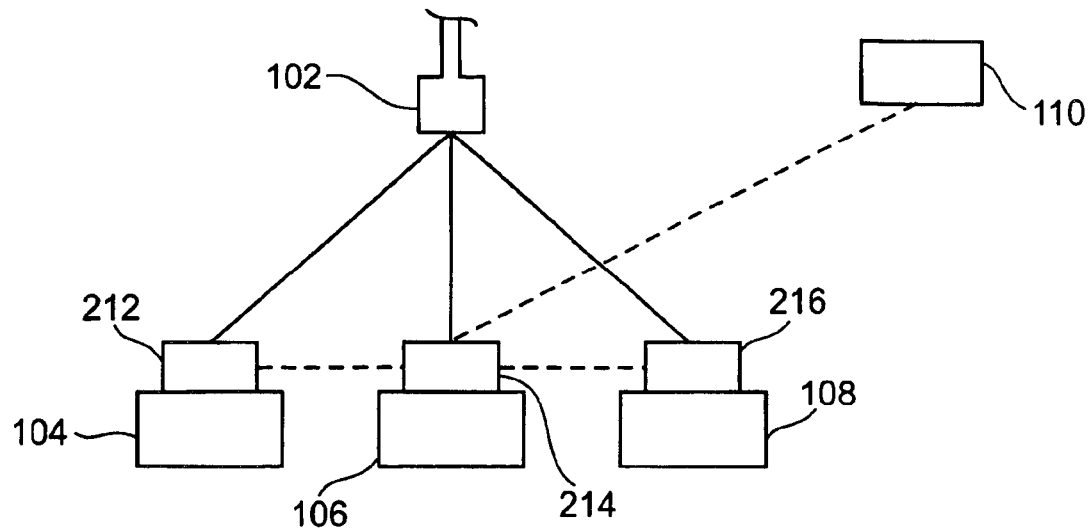
FIG. 2c shows a simplified block diagram of a controller for controlling power allocation according to the invention.
Figure 2D:
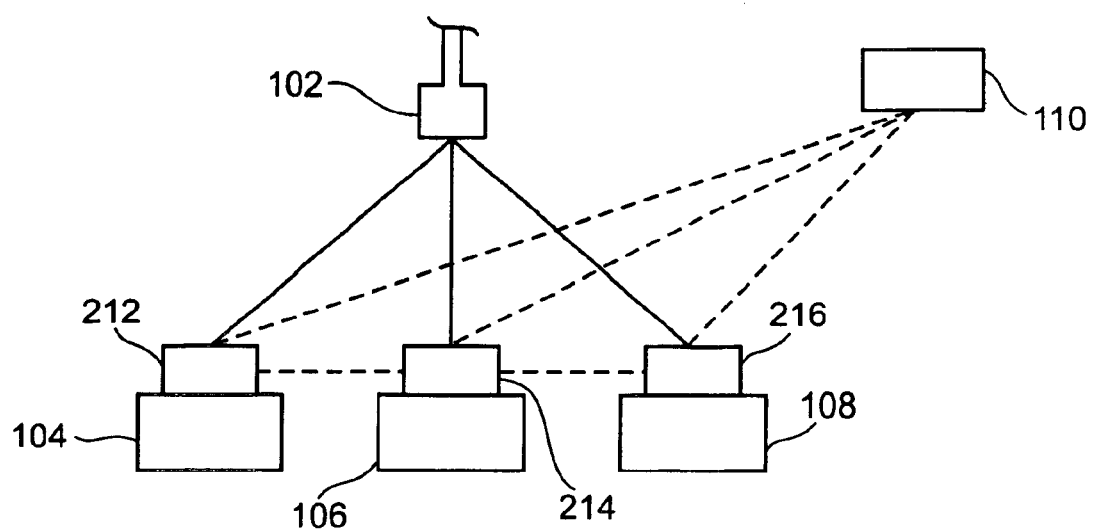
FIG. 2d shows a simplified block diagram of a controller for controlling power allocation according to the invention.

Referring to FIG. 2b another embodiment 200 of a controller for controlling power allocation in an overdemand situation of an airport support system according to the invention is shown. Here, the controller 200 comprises a control device 212, 214, and 216 for each subsystem 104, 106, and 108, respectively. Each of the control devices 212, 214, and 216 is connected via a communication link to the processor 110. Referring to FIGS. 2c and 2d different topologies for connecting the control devices 212, 214, and 216 with the processor 110 are shown. In FIG. 2c a star topology is shown connecting one control device 214 to the processor 110 and to the control devices 212 and 216. In the topology shown in FIG. 2d the control devices 212, 214, and 216 are connected to each other and each control device is connected to the processor 110. Providing each control device with a processor capable of performing the tasks of one of the other processors results in a fail safe architecture allowing complete functioning of the controller in case of a failure or interruption of a communication link. Of course, in such an application, the processor 110 is optionally obviated by selecting one of the processors within the control devices 212, 214, and 216 as a master controller and the others as slaves. Alternatively, each processor performs a same calculation to achieve a same control result, the control result from each processor provided from the associated control device to the device it is intended to control.

Apportioning power between different passenger loading bridges allows a further reduction of peak power consumption. For example, not all passenger loading bridges are driven at a same time or provide ground power and preconditioned air to large aircraft. This fact is exploited by the controller in providing more power to selected passenger loading bridges that need the power to service a large aircraft while limiting power provision to other passenger loading bridges servicing smaller aircraft. Another possibility for reducing peak power consumption is the smart use of the various terminals. For example, designating passenger loading bridges to various types of aircraft such that a designated passenger loading bridge services aircraft having similar locations of doors at similar levels, substantially reduces the movement of the passenger loading bridge and, therefore, power consumption. Furthermore, peak power consumption is reduced by limiting power provision to the preconditioned air system until, for example, a passenger loading bridge is moved in place for servicing an aircraft. Limiting power to the preconditioned air system to 100 Amp instead of 200 Amp for 5 loading bridges results in freeing of 500 Amp for other purposes such as driving a sixth passenger loading bridge. Limiting power to the preconditioned air system is easily possible for short time periods while a passenger loading bridge is moved without causing inconveniences to passengers.

Of course, when a passenger loading bridge is not being used—the plane is being towed out of its embarking location or another plane is approaching the embarking location—power to that passenger loading bridge is significantly reduceable and, as such, power savings are experienced then as well. Thus the invention is applicable to use self-contained within one bridge or to use for apportioning power between a plurality of passenger loading bridges.

Figure 3A:
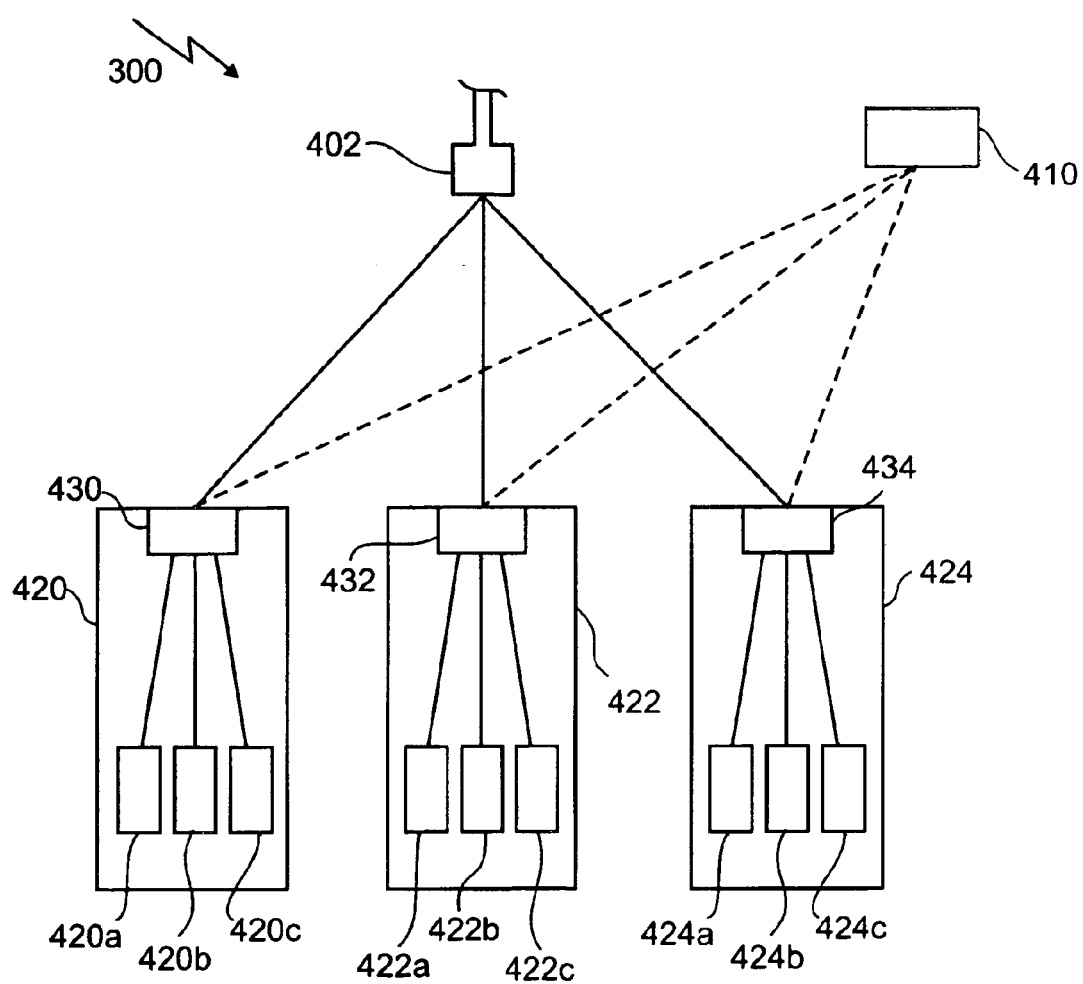
FIG. 3a shows a simplified block diagram of a controller for controlling power allocation to a plurality of passenger loading bridges according to the invention; and, FIG. 3b shows a simplified block diagram of a controller for controlling power allocation to a plurality of passenger loading bridges according to the invention.
Figure 3B:
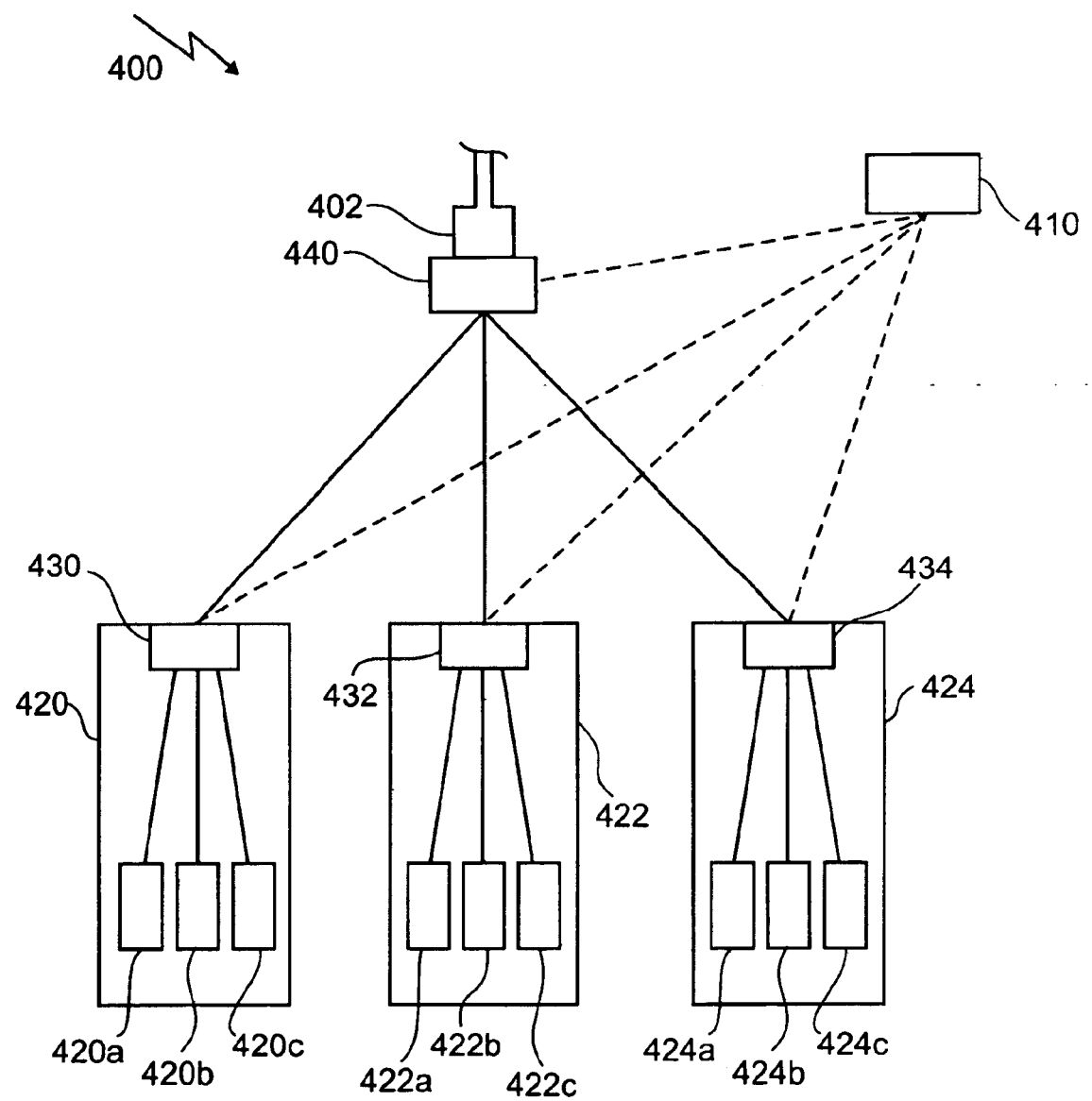

Referring to FIG. 3a, a controller 300 for controlling power allocation in an overdemand situation to a plurality of passenger loading bridges according to the invention is shown. In a simple embodiment controllers as shown in FIGS. 2a to 2d are incorporated in each of passenger loading bridges 420, 422, and 424 and then linked to a high level processor 410 via a communication link, indicated by dashed lines. In this embodiment power provided by a feed line 402 is branched into power lines servicing each passenger loading bridge and is controlled by control devices 430, 432, and 434, which are in signal communication with the processor 410. Alternatively, provision of power to each passenger loading bridge is controlled using higher level control device 440, which is in signal communication with the processor 410, as shown in the system 400 illustrated in FIG. 4b. Further alternatively, power provided to each passenger loading bridge is rerouted to a central control device for provision to control devices 430, 432, and 434.

Determination of the amount of power for provision to each subsystem is performed, for example, by using the high level processor for determining provision of power to each passenger loading bridge and a processor incorporated in the controller of each passenger loading bridge for determining the amount of power for provision to each subsystem of the passenger loading bridge, respectively. Alternatively, each processor is enabled to determine the amount of power for provision to each subsystem thus providing a fail safe architecture.

The power allocation control according to the invention is highly advantageous due to the capability of managing situations of overdemand or of overcommitted resources. Therefore, use of the power allocation control according to the invention results in a substantial reduction of peak power demand while at a same time performance of all necessary operations of the passenger loading bridges is ensured. Due to the reduction of peak power demand it is possible to substantially reduce the size of power feed lines resulting in a substantial reduction of infrastructure cost. For example, retrofitting the existing passenger loading bridges with a power allocation control according to the invention provides the capability for adding more passenger loading bridges to an airport terminal without expanding the power supply line or installing significant, and therefore costly, new power supply lines. Another aspect is the expansion of a passenger loading bridge to service two aircrafts without changing the feed line, which results in a substantial cost reduction.

Numerous other embodiments of the invention will be apparent to persons skilled in the art without departing from the spirit and scope of the invention as defined in the appended claims.

What is claimed is:

1. A method for controlling power allocation in an overdemand situation of an airport support system comprising:
   determining a requested amount of power;
   determining an amount of power available; and,
   apportioning, when the amount of power available is less than the amount of power required amongst subsystems demanding power, the amount of power available to result in a load of the airport support system requiring no more than the power available and to provide sufficient power where required, wherein apportioning is performed on a prioritized basis to account for each of minimum requirements, operational requirements, and ideal requirements for each subsystem.

2. A method for controlling power allocation according to claim 1 wherein apportioning is performed based on an operational mode of the airport support system.

3. A method for controlling power allocation according to claim 1 wherein essential subsystems are provided with sufficient power to support a minimum power requirement of the essential services they provide.

4. A method for controlling power allocation according to claim 3 wherein less essential subsystems receive less power than the ideal amount of power for providing less than ideal operation, the less than ideal operation being more suitable than no operation but less suitable for its purpose than the ideal operation.

5. A method for controlling power allocation according to claim 4 wherein at least one of the less essential subsystems receive an amount of power being the minimum amount of power for the system to operate.

6. A method for controlling power allocation according to claim 3 wherein no power is allocated to at least one of the less essential subsystems.

7. A method for controlling power allocation according to claim 2 wherein the airport support system includes at least a passenger loading bridge.

8. A method for controlling power allocation according to claim 7 wherein apportioning involves apportioning of power between different passenger loading bridges.

9. A method for controlling power allocation in an overdemand situation of at least a passenger loading bridge comprising:

determining a requested amount of power;

determining an amount of power available; and, apportioning on a prioritized basis, when the amount of power available is less than the amount of power required amongst systems of the at least a passenger loading bridge demanding power, the amount of power available to result in a load of the at least a passenger loading bridge requiring no more than the power available and to provide sufficient power to account for one of minimum requirements, operational requirements and ideal requirements for each system based on an operational mode of the at least a passenger loading bridge.

10. A method for controlling power allocation according to claim 9 wherein apportioning involves apportioning power between different passenger loading bridges.

11. A method for controlling power allocation according to claim 10 wherein at least a system operates across different passenger loading bridges.

12. A method for controlling power allocation according to claim 9 wherein essential systems in the operational mode are provided with sufficient power to meet ideal requirements.

13. A method for controlling power allocation according to claim 12 wherein less essential systems in the operational mode are provided with sufficient power to meet operational requirements.

14. A method for controlling power allocation according to claim 13 wherein some of the less essential systems in the operational mode are provided with sufficient power to meet minimum requirements.

15. A method for controlling power allocation according to claim 14 wherein no power is allocated to non-essential systems in the operational mode.

16. A controller for controlling power allocation in an overdemand situation of an airport support system including at least a passenger loading bridge comprising: a processor for:

determining a requested amount of power, determining an amount of power available, determining, when the amount of power available is less than the amount of power required amongst subsystems demanding power, an apportioning of the amount of power available to result in a load of the airport support system including at least a passenger loading bridge requiring no more than the power available and to provide sufficient power where required, and providing a control signal based on the determined apportioning;

at least a control device for receiving the control signal and for controlling provision of the apportioned amount of power to at least a subsystem in dependence thereupon; and, a communication link connecting the processor and the at least a control device for providing control signal communication therebetween.

17. A controller for controlling power allocation according to claim 16 wherein the processor is used for apportioning of power between different passenger loading bridges.

18. A controller for controlling power allocation according to claim 17 wherein the controller comprises at least a secondary processor in signal communication with the processor for apportioning power amongst subsystems of at least a passenger loading bridge.

* * * * *